(12) United States Patent
Blaney et al.

(10) Patent No.: US 11,073,037 B2
(45) Date of Patent: Jul. 27, 2021

(54) CMC BOAS ARRANGEMENT

(71) Applicant: United Technologies Corporation, Farmington, CT (US)

(72) Inventors: Ken F. Blaney, Middleton, NH (US); Thomas E. Clark, Sanford, ME (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 124 days.

(21) Appl. No.: 16/516,920

(22) Filed: Jul. 19, 2019

(65) Prior Publication Data
US 2021/0017871 A1  Jan. 21, 2021

(51) Int. Cl.
*F01D 11/08* (2006.01)

(52) U.S. Cl.
CPC .......... *F01D 11/08* (2013.01); *F05D 2240/55* (2013.01); *F05D 2260/30* (2013.01); *F05D 2300/6033* (2013.01)

(58) Field of Classification Search
CPC .......... F01D 11/00; F01D 11/08; F01D 25/24; F05D 2240/55; F05D 2260/30; F05D 2300/6033
See application file for complete search history.

(56) References Cited

U.S. PATENT DOCUMENTS

| | | | | |
|---|---|---|---|---|
| 5,228,828 A * | 7/1993 | Damlis | ............... | F01D 11/22 415/173.2 |
| 6,406,256 B1 * | 6/2002 | Marx | ............... | F01D 11/16 415/138 |
| 6,702,550 B2 * | 3/2004 | Darkins, Jr. | ............... | F01D 9/04 415/116 |
| 7,052,235 B2 * | 5/2006 | Alford | ............... | F01D 9/04 415/173.1 |
| 9,458,726 B2 * | 10/2016 | Lamusga | ............... | F01D 5/225 |
| 9,945,256 B2 | 4/2018 | Freeman et al. | | |
| 10,233,763 B2 | 3/2019 | McCaffrey | | |
| 2009/0285675 A1 | 11/2009 | Lewis | | |
| 2014/0271145 A1 * | 9/2014 | Thomas | ............... | F01D 11/24 415/173.1 |

(Continued)

FOREIGN PATENT DOCUMENTS

| | | |
|---|---|---|
| EP | 1076161 | 2/2001 |
| EP | 3000975 | 3/2016 |

(Continued)

OTHER PUBLICATIONS

Extended European Search Report for EP Application No. 20183233.4 dated Oct. 1, 2020.

(Continued)

*Primary Examiner* — Igor Kershteyn
(74) *Attorney, Agent, or Firm* — Carlson, Gaskey & Olds, P.C.

(57) ABSTRACT

A blade outer air seal assembly includes a blade outer air seal that has a plurality of segments that extend circumferentially about an axis and are mounted in a support structure via a carrier. At least one of the segments have a first wall circumferentially spaced from a second wall. A base portion extends from the first wall to the second wall. The first and second walls extend at an angle less than 90° from the base portion. The carrier has a flat portion that extends from the first wall to the second wall.

20 Claims, 7 Drawing Sheets

(56) References Cited

U.S. PATENT DOCUMENTS

| | | | |
|---|---|---|---|
| 2014/0286751 A1 | 9/2014 | Brunelli | |
| 2015/0345308 A1 | 12/2015 | Roberts, Jr. | |
| 2016/0169025 A1 | 6/2016 | Lamusga | |
| 2016/0319686 A1 | 11/2016 | Shi et al. | |
| 2016/0319841 A1* | 11/2016 | McCaffrey | F01D 25/12 |
| 2016/0333740 A1 | 11/2016 | Sluyter | |
| 2017/0268367 A1* | 9/2017 | McCaffrey | F01D 9/04 |
| 2017/0276000 A1* | 9/2017 | Snider | F01D 11/10 |
| 2017/0350268 A1* | 12/2017 | McCaffrey | F01D 11/08 |
| 2017/0370240 A1 | 12/2017 | Sippel | |

FOREIGN PATENT DOCUMENTS

| | | |
|---|---|---|
| EP | 3009606 | 4/2016 |
| EP | 3029278 | 6/2016 |
| EP | 3088680 | 11/2016 |
| EP | 3141703 | 3/2017 |
| EP | 3219934 | 9/2017 |
| EP | 3228829 | 10/2017 |
| EP | 3255252 | 12/2017 |
| EP | 3287606 | 2/2018 |
| EP | 3033509 | 5/2019 |
| GB | 2450213 | 12/2008 |
| WO | 20140163674 | 10/2014 |
| WO | 20150138027 | 9/2015 |

OTHER PUBLICATIONS

Extended European Search Report for EP Application No. 20183253.2 dated Sep. 30, 2020.

Extended European Search Report for EP Application No. 20183256.5 dated Sep. 30, 2020.

Extended European Search Report for EP Application No. 20183261.5 dated Oct. 6, 2020.

* cited by examiner

CMC BOAS ARRANGEMENT

BACKGROUND

This application relates to a blade outer air seal assembly.

Gas turbine engines are known and typically include a compressor compressing air and delivering it into a combustor. The air is mixed with fuel in the combustor and ignited. Products of the combustion pass downstream over turbine rotors, driving them to rotate.

It is desirable to ensure that the bulk of the products of combustion pass over turbine blades on the turbine rotor. As such, it is known to provide blade outer air seals radially outwardly of the blades. Blade outer air seals have been proposed made of ceramic matrix composite fiber layers.

SUMMARY OF THE INVENTION

In one exemplary embodiment, a blade outer air seal assembly includes a blade outer air seal that has a plurality of segments that extend circumferentially about an axis and are mounted in a support structure via a carrier. At least one of the segments have a first wall circumferentially spaced from a second wall. A base portion extends from the first wall to the second wall. The first and second walls extend at an angle less than 90° from the base portion. The carrier has a flat portion that extends from the first wall to the second wall.

In a further embodiment of any of the above, the carrier has a first angled surface and a second angled surface. The first and second angled surfaces are in engagement with the first and second walls.

In a further embodiment of any of the above, an aft wall extends circumferentially outward past the first and second angled surfaces at an aft end of the carrier.

In a further embodiment of any of the above, a first hook extends from the first wall and a second hook extends from the second wall.

In a further embodiment of any of the above, the first and second hooks extend away from one another.

In a further embodiment of any of the above, the carrier includes a carrier hook that extends radially outward and engages the support structure.

In a further embodiment of any of the above, the carrier hook extends across a circumferential width of the carrier.

In a further embodiment of any of the above, a plurality of holes extend through the flat portion.

In a further embodiment of any of the above, the first and second walls are engaged with a wedge seal.

In a further embodiment of any of the above, the carrier is a metallic material.

In a further embodiment of any of the above, at least one segment is a ceramic matrix composite material.

In another exemplary embodiment, a gas turbine engine includes a compressor section, a combustor section, and a turbine section arranged about an axis of rotation. A blade outer air seal has a plurality of segments that extend circumferentially about the axis of rotation and mounted in a support structure via a carrier. At least one of the segments have a first wall circumferentially spaced from a second wall. A base portion extends from the first wall to the second wall. The first and second walls extend at an angle less than 90° from the base portion. The carrier has a flat portion that extends from the first wall to the second wall.

In a further embodiment of any of the above, the carrier has a first angled surface and a second angled surface. The first and second angled surfaces are in engagement with the first and second walls.

In a further embodiment of any of the above, an aft wall extends circumferentially outward past the first and second angled surfaces at an aft end of the carrier.

In a further embodiment of any of the above, a first hook extends from the first wall and a second hook extends from the second wall. The first and second hooks extend away from one another.

In a further embodiment of any of the above, the carrier includes a carrier hook that extends radially outward and engages the support structure.

In a further embodiment of any of the above, the carrier hook extends across a circumferential width of the carrier.

In a further embodiment of any of the above, a plurality of holes extend through the flat portion.

In a further embodiment of any of the above, the first and second walls are engaged with a wedge seal.

In a further embodiment of any of the above, the carrier is a metallic material. At least one segment is a ceramic matrix composite material.

DETAILED DESCRIPTION

Figure 1:
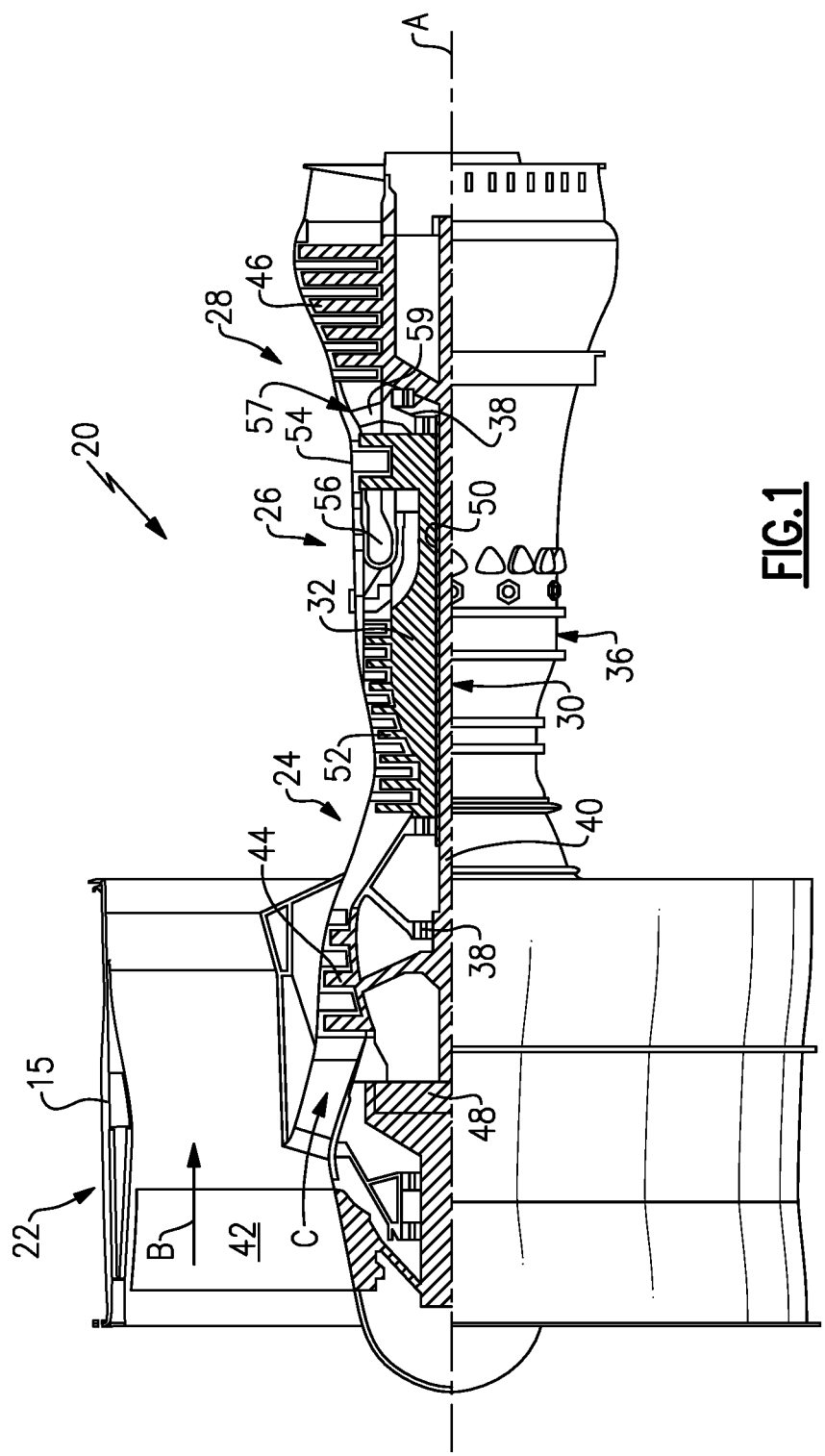
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\,°\,R)/(518.7°\,R)]^{0.5}$. The "Low corrected fan tip speed" as disclosed herein according to one non-limiting embodiment is less than about 1150 ft/second (350.5 meters/second).

Figure 2:
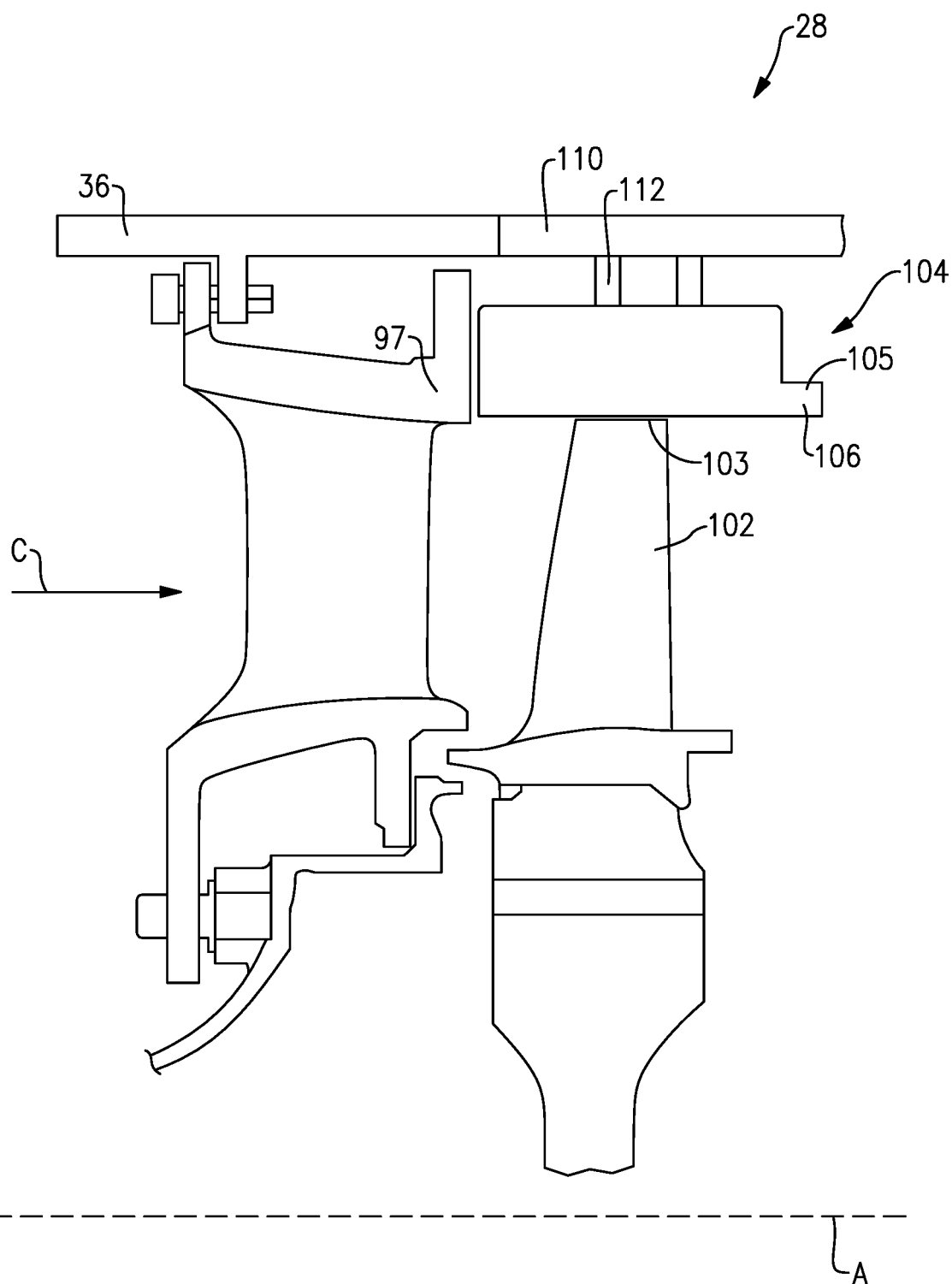
FIG. 2 schematically illustrates an example turbine section.

FIG. 2 shows a portion of an example turbine section 28, which may be incorporated into a gas turbine engine such as the one shown in FIG. 1. However, it should be understood that other sections of the gas turbine engine 20 or other gas turbine engines, and even gas turbine engines not having a fan section at all, could benefit from this disclosure. The turbine section 28 includes a plurality of alternating turbine blades 102 and turbine vanes 97.

A turbine blade 102 has a radially outer tip 103 that is spaced from a blade outer air seal assembly 104 with a blade outer air seal ("BOAS") 106. The BOAS 106 may be made up of a plurality of seal segments 105 that are circumferentially arranged in an annulus about the central axis A of the engine 20. The BOAS segments 105 may be monolithic bodies that are formed of a ceramic material, such as a ceramic matrix composite ("CMC") or monolithic ceramic.

The BOAS 106 may be mounted to an engine case or structure, such as engine static structure 36 via a control ring or support structure 110 and a carrier 112. The engine structure 36 may extend for a full 360° about the engine axis A. The engine structure 36 may support the support structure 110 via a hook or other attachment means. The engine case or support structure holds the BOAS 106 radially outward of the turbine blades 102.

Figure 3:
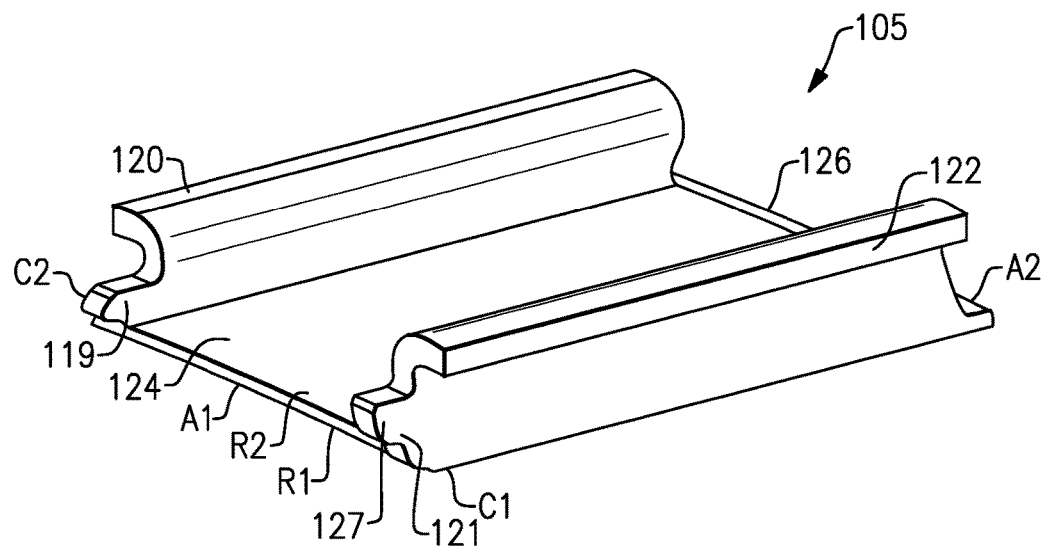
FIG. 3 illustrates an exemplary blade outer air seal.

FIG. 3 illustrates an example BOAS segment 105. Each seal segment 105 is a body that defines radially inner and outer sides R1, R2, respectively, first and second axial sides A1, A2, respectively, and first and second circumferential sides C1, C2, respectively. The radially inner side R1 faces in a direction toward the engine central axis A. The radially inner side R1 is thus the gas path side of the seal segment 105 that bounds a portion of the core flow path C. The first axial side A1 faces in a forward direction toward the front of the engine 20 (i.e., toward the fan 42), and the second axial side A2 faces in an aft direction toward the rear of the engine 20 (i.e., toward the exhaust end).

In the illustrated example, each BOAS segment 105 includes a first wall 119 having a first hook 120 and a second wall 121 having a second hook 122. The first and second walls 119, 121 extend generally radially outward from a base portion 124, and the first and second hooks 120, 122 extend circumferentially from the first and second walls 119, 121, respectively. As will be explained further below, the first and second walls 119, 121 extend at an angle relative to the base portion 124. The first and second hooks 120, 122 extend circumferentially outward from the first and second walls 119, 121, respectively. The first and second hooks 120, 122 may extend substantially parallel to the base portion 124, for example. The first and second hooks 120, 122 point away from one another. In this example, the hooks 120, 122 extend towards the matefaces, or first and second circumferential sides C1, C2. The first and second hooks 120, 122 extend along the base portion 124 in a generally axial direction, and are circumferentially spaced from one another. The base portion 124 extends between the first and second axial sides A1, A2 and defines a gas path on a radially inner side and a non-gas path on a radially outer side. In this disclosure, forward, aft, upstream, downstream, axial, radial, or circumferential is in relation to the engine axis A unless stated otherwise. The base portion 124 may extend axially forward and/or aft of the first and second walls 119, 121 to provide a surface 126 for sealing of the BOAS first and second axial sides A1, A2. The walls 119, 121 provide surfaces for securing the BOAS segment 105 to the carrier 112 and/or support structure 110.

The BOAS 106 may be formed of a ceramic matrix composite ("CMC") material. Each seal segment 105 is formed of a plurality of CMC laminates. The laminates may be silicon carbide fibers, formed into a braided or woven fabric in each layer. In other examples, the BOAS 106 may be made of a monolithic ceramic.

CMC components such as BOAS segments 105 are formed by laying fiber material, such as laminate sheets or braids, in tooling, injecting a gaseous infiltrant into the tooling, and reacting to form a solid composite component. The component may be further densified by adding additional material to coat the laminates. In some examples, the base portion 124, first and second walls 119, 121, and first and second hooks 120, 122 are formed from the same number of laminate plies, and thus have substantially the same thickness.

Figure 4:
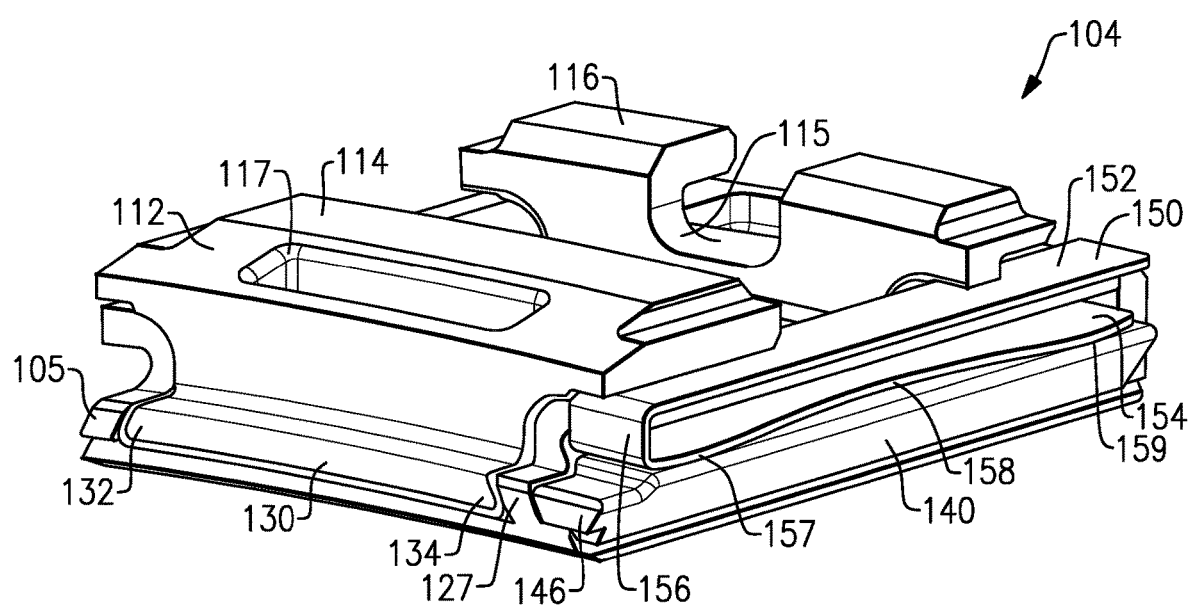
FIG. 4 illustrates a portion of an exemplary blade outer air seal assembly.

FIG. 4 illustrates a portion of the example BOAS assembly 104. The carrier 112 includes a flat portion 130 at a radially inner portion of the carrier 112. The flat portion 130 has a first circumferential side 132 and a second circumferential side 134. The first and second circumferential sides are in engagement with the walls 119, 121 of the seal segment 105. The carrier 112 includes a first hook 114 and a second hook 116 for engagement to a support structure or engine structure. The first and second hooks 114, 116 extend across a width of the carrier in the circumferential direction. In the illustrated embodiment, the first and second hooks 114, 116 extend axially aft. This allows the carrier 112 to be mounted onto the support structure or engine structure from an axially forward position. The carrier 112 may include recesses 115, 117. The recesses 115, 117 may reduce weight in the overall assembly 104, for example. The recess 115 may also help prevent rotation of the carrier 112.

A wedge seal 140 is arranged along the circumferential sides C1, C2 of each BOAS segment 105. In some examples, a clip 150 secures the wedge seal 140 in place. The clip 150 has a radially outer portion 152 and a radially inner portion 154 spaced by a radially extending wall 156. The radially inner and outer portions 154, 152 may be spring loaded to secure the clip 150 in place, for example. The clip 150 may bias the wedge seal 140 radially inward. The clip 150 fits over the hooks 120, 122 of the adjacent seal segments 105. The radially outer portion 152 extends along the length of the hooks 120, 122 in the axial direction. Although an example clip 150 arrangement is shown, other clip arrangements may be used to secure the wedge seal 140 in the circumferential and/or axial directions. The clip 150 may be formed from a metallic material, such as cobalt or nickel, for example. This wedge seal arrangement eliminates the need for machining a slot into the seal segment 105 for a feather seal.

The wedge seal 140 and clip 150 extend in the axial direction for most of the axial length of the hooks 120, 122. For example, the wedge seal 140 and/or clip 150 may extend at least 80% of an axial length of the hooks 120, 122. In some examples, the flat portion 130 may provide a face seal. The flat portion 130 may also seal with a brush seal or W-seal.

Figure 5:
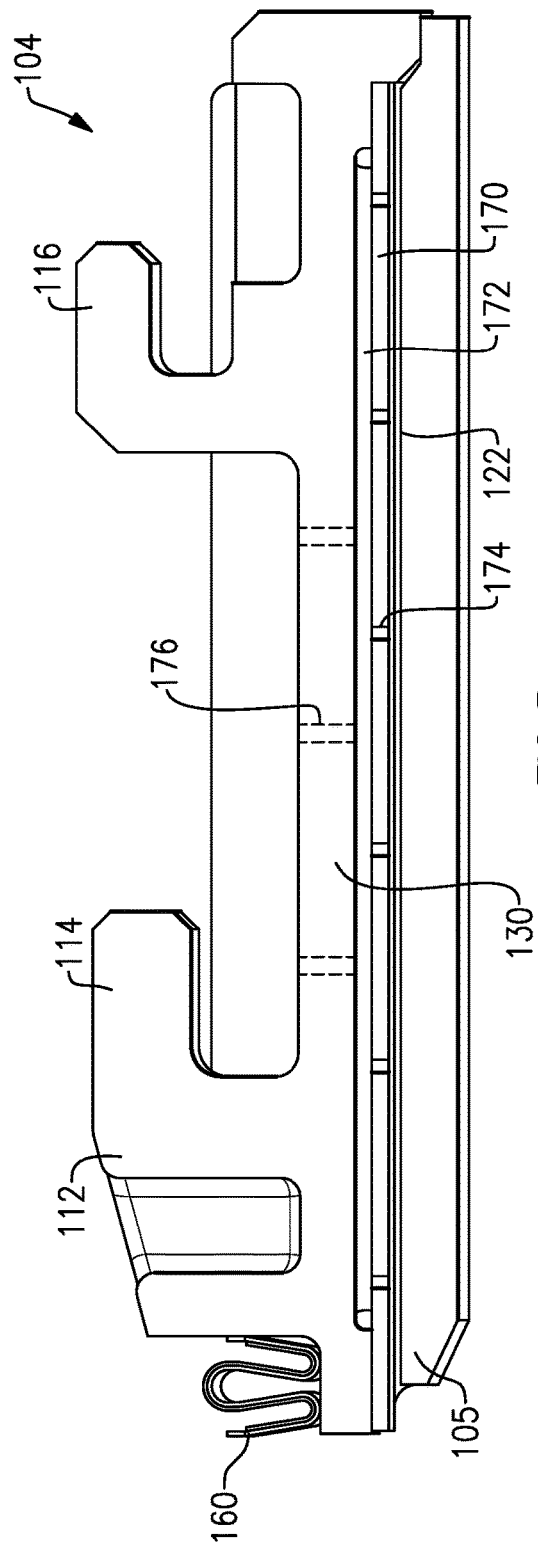
FIG. 5 illustrates a cross-sectional view of the exemplary blade outer air seal assembly.

FIG. 5 illustrates a cross-sectional view of a portion of the BOAS assembly 104. A cavity 172 is arranged in the flat portion 130 of the carrier 112. The cavity 172 is near the seal segment 105. The cavity 172 may extend most of a circumferential width of the flat portion 130. For example, the cavity 172 extends at least 50% of a circumferential width of the flat portion 130. A plurality of holes 176 may extend through the carrier 112 and into the cavity 172.

In some examples, an impingement plate 170 is arranged between the carrier 112 and the seal segment 105. A plurality of holes 174 extend through the impingement plate 170. Thus, cooling air from the cavity 172 may flow through the impingement plate 170 to the seal segment 105. The impingement plate 170 may be a metallic material, in some examples. The impingement plate 170 may be welded to the carrier 112. The holes 176 and impingement plate 170 create a pressure drop across the assembly 104. This pressure drop may help reduce loading on the BOAS segment 105.

The impingement plate 170 provides a compatible interface between the carrier 112 and the BOAS segment 105. In other examples, an interface coating may be used on the carrier 112 between the carrier 112 and the BOAS segment 105. In this example, the assembly 104 may not include an impingement plate 170.

In some examples, a seal 160 is engaged with a forward portion of the carrier 112. The seal 160 may be a W seal or a brush seal, for example.

Figure 6:
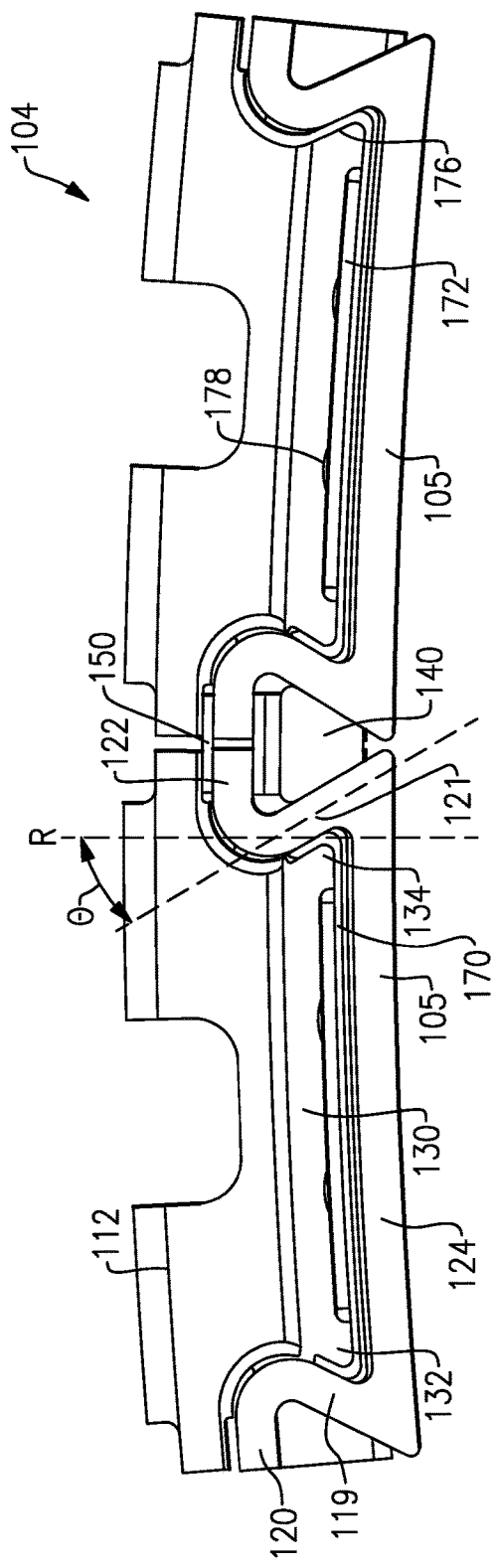
FIG. 6 illustrates a front view of the exemplary blade outer air seal assembly.

FIG. 6 illustrates a front view of a portion of the example BOAS assembly 104. The first and second walls 119, 121 extend at an angle Θ relative to the radial direction R. The angle Θ is less than 90°, for example. In one example, the angle Θ is between about 20° and about 70°. The radial direction R is substantially normal to the base portion 124 of the seal segment 105. Thus, the first and second walls 119, 121 also extend at an angle less than 90° from the base portion 124. The angled walls 119, 121 engage with the first and second circumferential sides 132, 134 of the carrier 112. The first and second circumferential sides 132, 134 have angled surfaces that engage with the first and second walls 119, 121. The first and second circumferential sides 132, 134 thus have an "inward dovetail" shape for securement to the BOAS segment 105. The wedge seal 140 also engages with the angled first and second walls 119, 121. In some examples, the impingement plate 170 wraps around the first and second circumferential sides 132, 134 of the carrier 112 between the carrier 112 and the BOAS segment 105.

The cavity 172 is between the carrier 112 and the impingement plate 170. One or more grooves 178 may be arranged in the cavity 172. The grooves 178 may facilitate the diffusion of air across the impingement plate 170. In other embodiments, cooling holes into the cavity 172 may have a cone at a cooling hole exit to facilitate diffusion.

The assembly 104 is assembled axially. The carrier 112 may be hooked onto a support structure or engine structure. Then, the BOAS segment 105 is slid axially onto the carrier 112. Next, the wedge seal 140 and spring clip 150 are slid axially between adjacent BOAS segments 105. This axial assembly may permit removal of a single seal segment 105 without disassembling the entire assembly 104.

Figure 7:
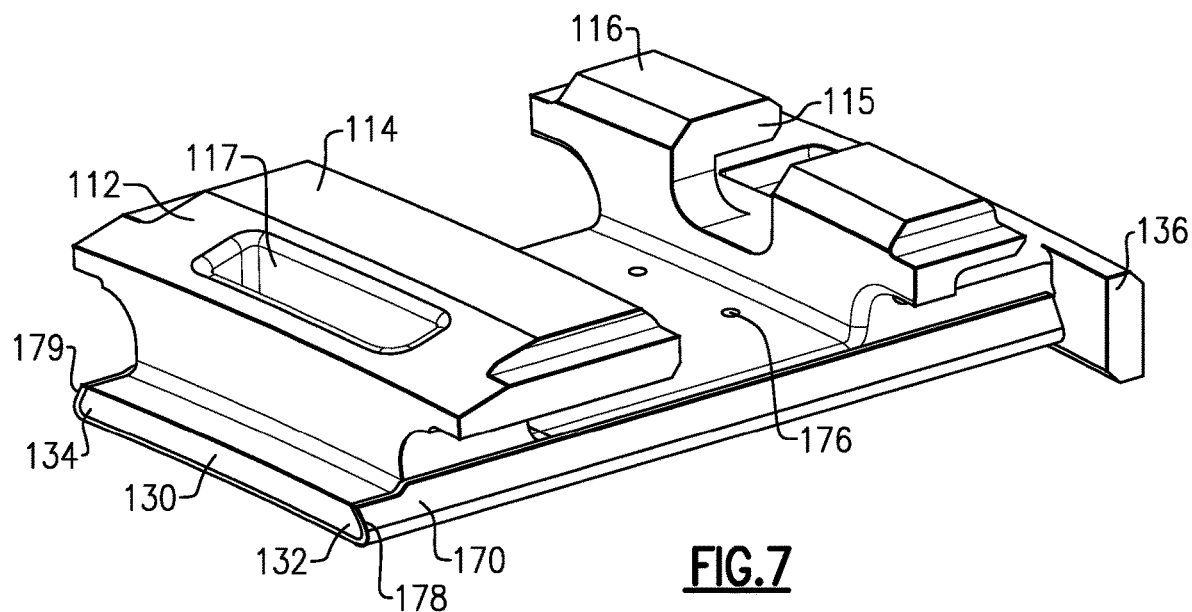
FIG. 7 illustrates an example carrier for a blade outer air seal assembly.

FIG. 7 illustrates the carrier 112. A plurality of holes 176 may extend in the generally radial direction. The impingement plate 170 extends generally axially and circumferentially. The impingement plate 170 has generally radial portions 179 that extend over the portions 132, 134 of the carrier 112. The radial portions 179 may extend at the same angle as the walls 119, 121. A wall 136 extends circumferentially beyond the portions 132, 134 at an aft end of the carrier 112. The wall 136 abuts the second axial side A2 of the seal segment 105 and helps retain the axial position of the seal segments 105.

Figure 8:
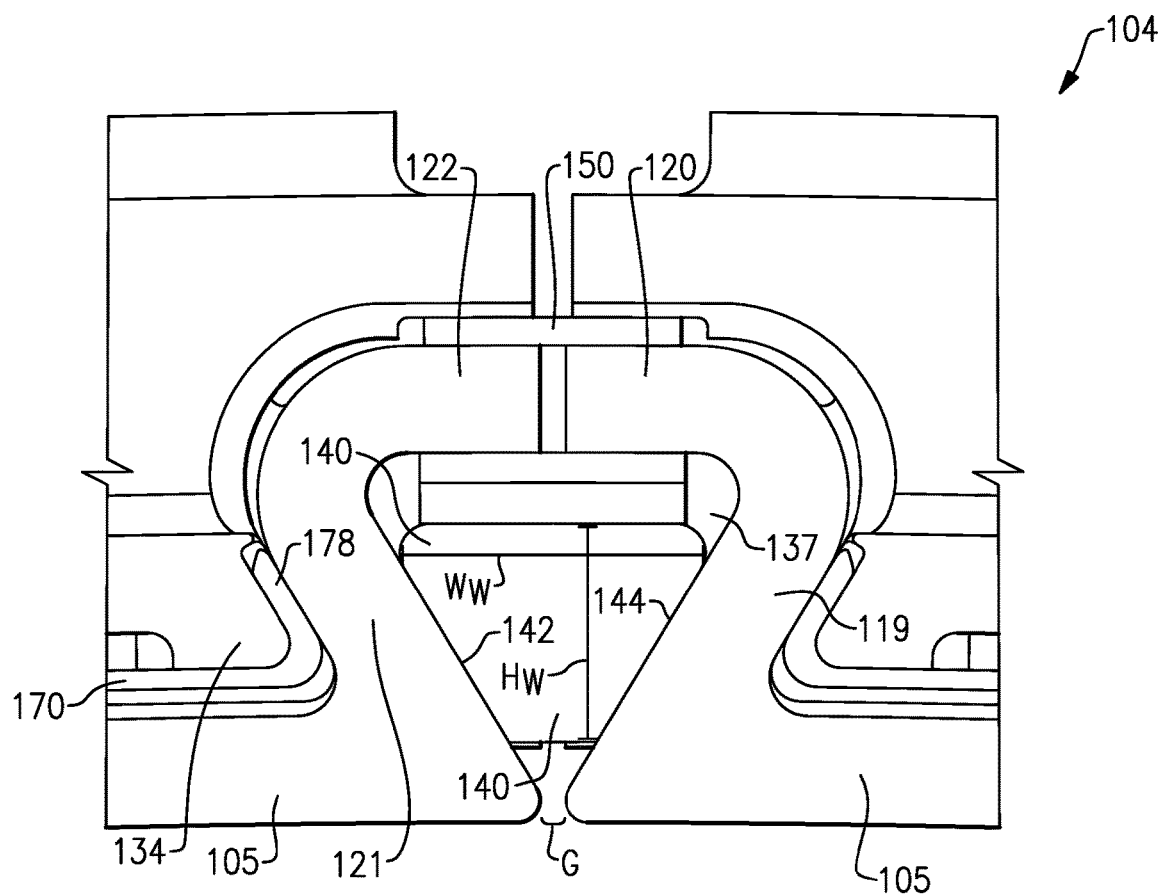
FIG. 8 illustrates a front view of the exemplary blade outer air seal assembly.

FIG. 8 illustrates a portion of the assembly 104. The first and second walls 119, 121 and first and second hooks 120, 122 of two adjacent seal segments 105 form a seal cavity 137. The wedge seal 140 is received within the seal cavity 137. The wedge seal 140 may have a width $W_W$ in the circumferential direction and a height $H_W$ in the radial direction. A ratio of the width $W_W$ to the height $H_W$ may be between about 1 and about 4.

The seal cavity 137 may have a gap G between seal segments 105 near the first radial sides R1. The gap G may permit gas path ingestion as blades pass by the gap G. The gas path ingestion may heat the wedge seal 140 and the BOAS walls 119, 121 and hooks 120, 122 to help reduce thermal stresses in the ceramic components. As turbine blades 102 (shown in FIG. 2) rotate, pressure ahead and behind the blade 102 as it passes the BOAS gap creates a pumping action. As this hot air heads radially outward between adjacent seal segments 105, the hooks 120, 122 and walls 119, 121 are heated. Known BOAS arrangements have thermally driven stress between the hot gaspath and the colder hook attachment regions. The disclosed BOAS arrangement may utilize intentional gaspath ingestion for mateface heating to reduce thermal stress on the BOAS segments. The disclosed arrangement adds hot air to minimize the thermal gradient within the part. Although this may increase the bulk CMC temperature, it improves the thermal gradient within the component. The wedge seal arrangement takes advantage of the rotating blades and static pressure wave interactions within the turbine.

Figure 9:
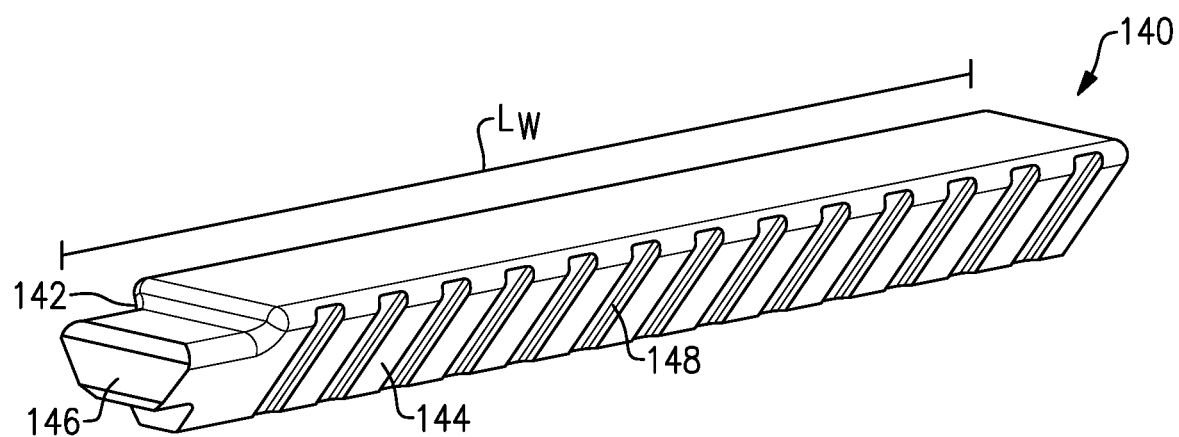
FIG. 9 illustrates an example wedge seal for the exemplary blade outer air seal assembly.

FIG. 9 illustrates an example wedge seal 140. The wedge seal 140 generally has a triangular cross-section, with a first angled surface 142 and a second angled surface 144. The first and second angled surfaces 142, 144 engage with the angled walls 119, 121 of adjacent BOAS segments 105. A protrusion 146 may extend axially forward from the wedge seal 140. The protrusion 146 may provide a surface for sealing a forward end of the assembly 104, for example. In an example, the wedge seal 140 has a length $L_W$ in the axial direction. The length $L_W$ is about the same as an axial length of the BOAS segments 105. The length $L_W$ may be at least about 80% of an axial length of the BOAS segments 105, for example.

In some examples, the wedge seal 140 includes a plurality of channels 148 that extend along the first and second angled surfaces 142, 144. The channels 148 may help facilitate gas path ingestion. That is, as the blades pass by the wedge seal 140, gaspath air may be forced radially outward into the intersegment gap between BOAS segments 105. The channels 148 direct the gaspath air towards the walls 119, 121 on the BOAS segment 105.

The wedge seal 140 is formed from a material having a high thermal resistance. For example, the wedge seal 140 may be a ceramic material, such as a ceramic matrix composite. Although the wedge seal 140 is shown with a particular BOAS assembly arrangement, the disclosed wedge seal 140 may be used in other BOAS arrangements.

Figure 10:
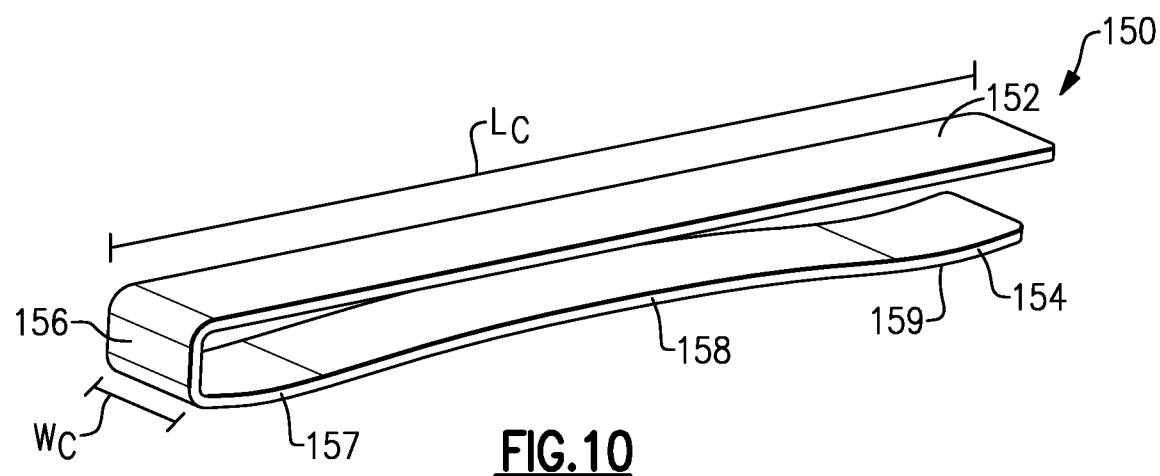
FIG. 10 illustrates an example clip for the exemplary blade outer air seal assembly.

FIG. 10 illustrates an example spring clip 150. The clip 150 generally includes an outer portion 152 and an inner portion 154 joined by a wall portion 156. The outer and inner portions 152, 154 generally extend in the axial direction, while the wall portion 156 generally extends in the axial direction. In the illustrated example, the outer portion 152 is substantially flat, while the inner portion 154 is curved. In other embodiments, the inner portion 154 may be flat, while the outer portion 152 is curved, or both portions may be curved. The clip 150 may have a length $L_C$ in the axial direction and a width $W_C$ in a circumferential direction. The length $L_C$ may be about the same as the length $L_W$ of the wedge seal 140. The width $W_C$ of the clip may be about the same as the width $W_W$ of the wedge seal 140. The width $W_C$ may depend upon the BOAS count, for example.

In some examples, the radially outer portion 152 may act as a featherseal between adjacent BOAS segments 105. The curved inner portion 154 is configured to contact the wedge seal 140 at points 157, 159 spaced axially from one another. A radially outermost portion of the inner portion 154 may contact the hooks 120, 122 of two adjacent seal segments 105, in some examples. The curved inner portion 154 provides a spring force that biases the wedge seal 140 radially inward. The clip 150 may be formed from a metallic material, such as nickel or cobalt, for example. Although the wedge seal 140 and spring clip 150 are shown as two separate components, they may be combined into a single piece, in some examples.

Figure 11:
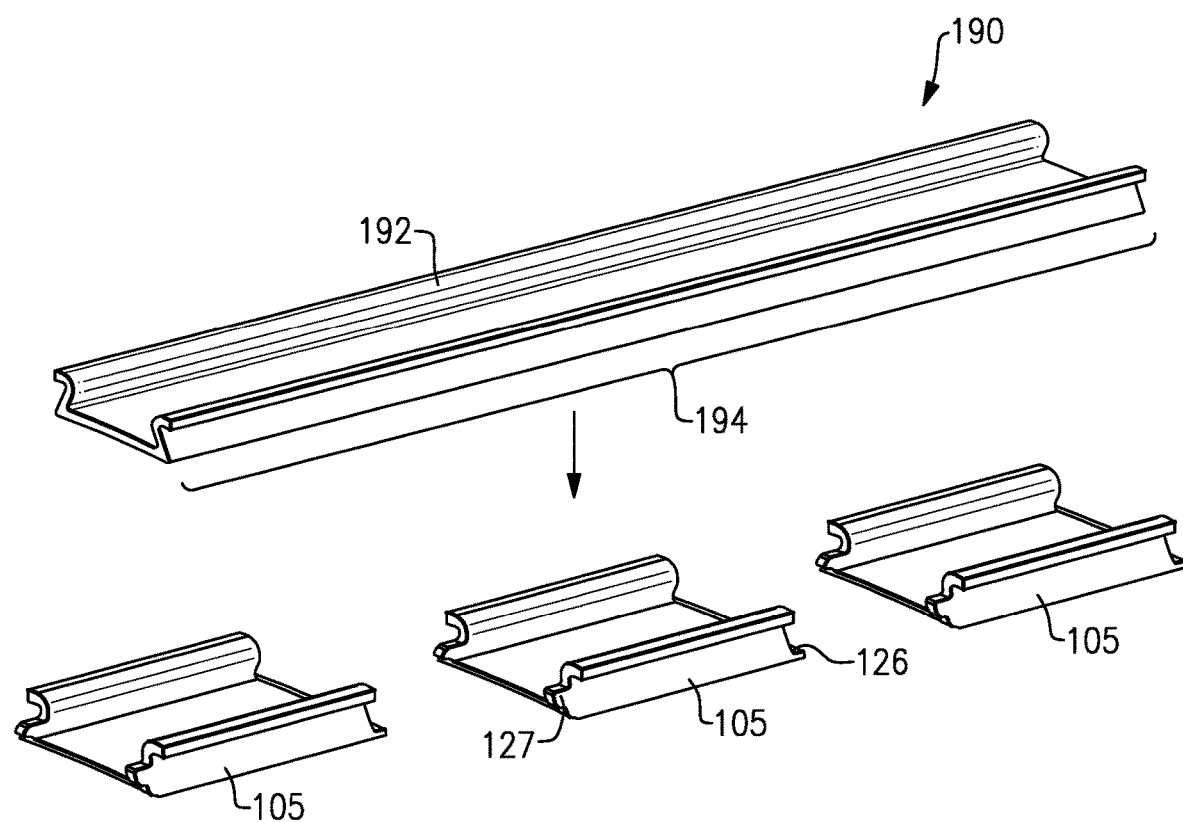
FIG. 11 illustrates an example method step of manufacturing a blade outer air seal.

FIG. 11, illustrates an example method step of manufacturing a blade outer air seal. A seal body 192 is formed having a length 194 that is longer than a single BOAS segment. The seal body 192 may be formed by laying laminate plies in a mold, or wrapping laminate plies about a mandrel, for example. In one example, the length 194 is greater than an axial length of two BOAS segments 105. In a further example, the length 194 is at least an axial length of three BOAS segments 105. Once the seal body 192 is formed, the seal body 192 is cut into a plurality of BOAS segments 105. The individual BOAS segments 105 may then be further machined to have features such as a tab 127 and an axially extending surface 126. In some examples, the seal body 192 is densified before the cutting step. The disclosed method may require less tooling and lower densification and machining costs. The disclosed method may also reduce the manufacturing time and fiber waste.

Although a particular BOAS arrangement is shown, the disclosed method of manufacturing may be utilized for other BOAS arrangements. In particular, the manufacturing method may be used for BOAS segments having axially extending features.

In this disclosure, "generally axially" means a direction having a vector component in the axial direction that is greater than a vector component in the circumferential direction, "generally radially" means a direction having a vector component in the radial direction that is greater than a vector component in the axial direction and "generally circumferentially" means a direction having a vector component in the circumferential direction that is greater than a vector component in the axial direction.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A blade outer air seal assembly, comprising:
   a blade outer air seal having a plurality of segments extending circumferentially about an axis and mounted in a support structure via a carrier, at least one of the segments having a first wall circumferentially spaced from a second wall, a base portion extending from the first wall to the second wall, the first and second walls extending at an angle less than 90° from the base portion; and the carrier having a flat portion extending from the first wall to the second wall, wherein the carrier has a first angled surface and a second angled surface, the first and second angled surfaces in engagement with the first and second walls.

2. The blade outer air seal assembly of claim 1, wherein an aft wall extends circumferentially outward past the first and second angled surfaces at an aft end of the carrier.

3. The blade outer air seal assembly of claim 1, wherein a first hook extends from the first wall and a second hook extends from the second wall.

4. The blade outer air seal assembly of claim 3, wherein the first and second hooks extend away from one another.

5. The blade outer air seal assembly of claim 1, wherein a plurality of holes extend through the flat portion.

6. The blade outer air seal assembly of claim 1, wherein the first and second walls are engaged with a wedge seal.

7. The blade outer air seal assembly of claim 1, wherein the carrier is a metallic material.

8. The blade outer air seal assembly of claim 1, wherein the at least one segment is a ceramic matrix composite material.

9. The blade outer air seal assembly of claim 1, wherein the carrier includes a carrier hook extending radially outward and engaging the support structure, and the carrier hook extends across a circumferential width of the carrier.

10. A blade outer air seal assembly, comprising:
a blade outer air seal having a plurality of segments extending circumferentially about an axis and mounted in a support structure via a carrier, at least one of the segments having a first wall circumferentially spaced from a second wall, a base portion extending from the first wall to the second wall, the first and second walls extending at an angle less than 90° from the base portion; and the carrier having a flat portion extending from the first wall to the second wall, wherein the carrier includes a carrier hook extending radially outward and engaging the support structure.

11. The blade outer air seal assembly of claim 10, wherein the carrier hook extends across a circumferential width of the carrier.

12. The blade outer air seal assembly of claim 10, wherein a first hook extends from the first wall and a second hook extends from the second wall, the first and second hooks extending away from one another.

13. A gas turbine engine, comprising:
a compressor section, a combustor section, and a turbine section arranged about an axis of rotation;
a blade outer air seal having a plurality of segments extending circumferentially about the axis of rotation and mounted in a support structure via a carrier, at least one of the segments having a first wall circumferentially spaced from a second wall, a base portion extending from the first wall to the second wall, the first and second walls extending at an angle less than 90° from the base portion; and the carrier having a flat portion extending from the first wall to the second wall, wherein the carrier has a first angled surface and a second angled surface, the first and second angled surfaces in engagement with the first and second walls.

14. The gas turbine engine of claim 13, a wherein an aft wall extends circumferentially outward past the first and second angled surfaces at an aft end of the carrier.

15. The gas turbine engine of claim 13, wherein a first hook extends from the first wall and a second hook extends from the second wall, the first and second hooks extend away from one another.

16. The gas turbine engine of claim 13, wherein the carrier includes a carrier hook extending radially outward and engaging the support structure.

17. The gas turbine engine of claim 16, wherein the carrier hook extends across a circumferential width of the carrier.

18. The gas turbine engine of claim 13, wherein a plurality of holes extend through the flat portion.

19. The gas turbine engine of claim 13, wherein the first and second walls are engaged with a wedge seal.

20. The gas turbine engine of claim 13, wherein the carrier is a metallic material and the at least one segment is a ceramic matrix composite material.

* * * * *